Dec. 10, 1957  O. L. SCHODORF, SR  2,815,861
RACK FOR PLATE GLASS
Filed Dec. 14, 1956  2 Sheets-Sheet 1
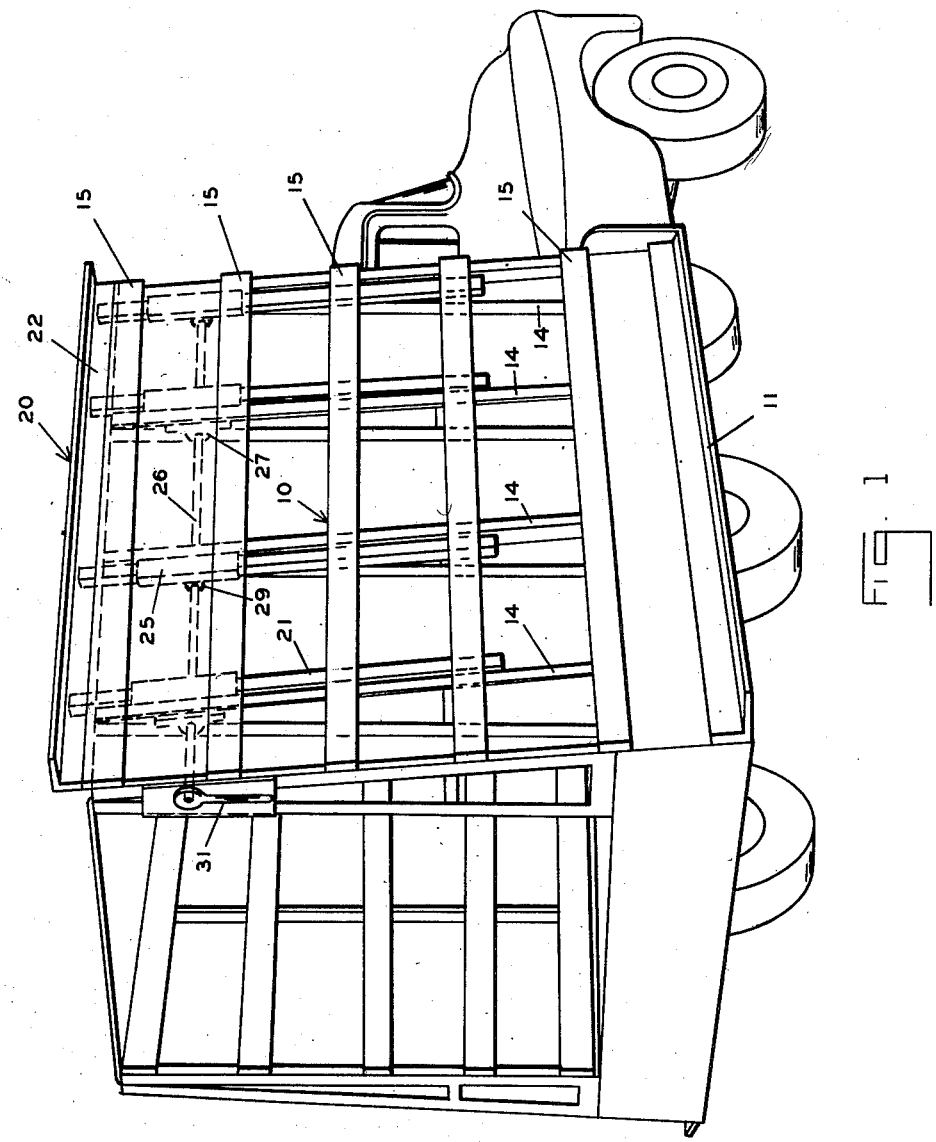
INVENTOR.
OTTO L. SCHODORF, SR.
BY
CORBETT, MAHONEY & MILLER
ATTYS.

Dec. 10, 1957    O. L. SCHODORF, SR    2,815,861
RACK FOR PLATE GLASS
Filed Dec. 14, 1956    2 Sheets-Sheet 2
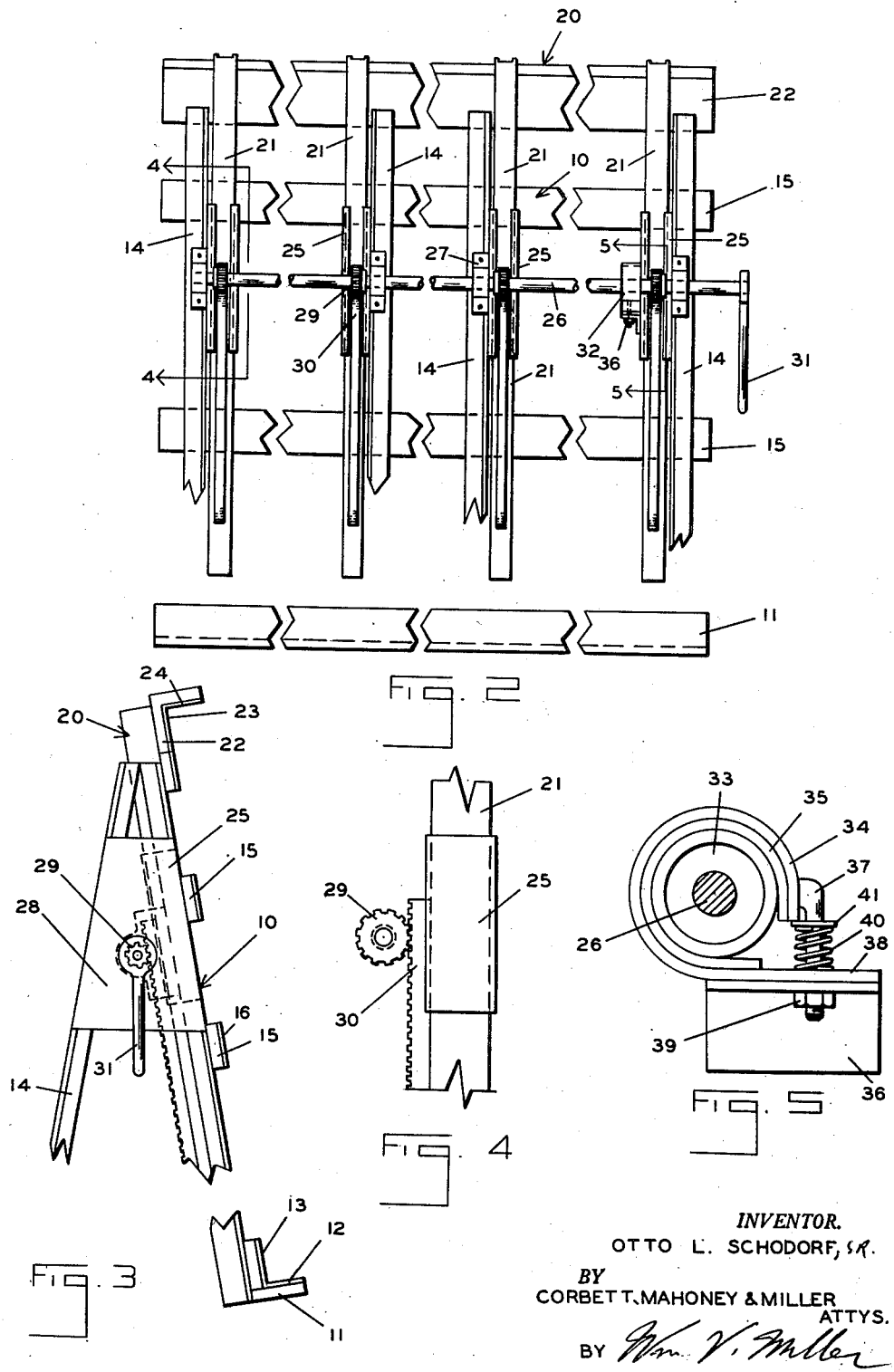
INVENTOR.
OTTO L. SCHODORF, SR.
BY
CORBETT, MAHONEY & MILLER
ATTYS.

United States Patent Office 2,815,861
Patented Dec. 10, 1957

2,815,861

RACK FOR PLATE GLASS

Otto L. Schodorf, Sr., Columbus, Ohio, assignor to Schodorf Truck Body & Equipment Co., Columbus, Ohio, a corporation of Ohio Application December 14, 1956, Serial No. 628,256

4 Claims. (Cl. 211—13)

This invention relates to a rack for plate glass. It has to do, more particularly, with a rack which is especially useful on a truck or other vehicle for receiving and transporting plate glass.

According to this invention there is provided a rack which will receive and support the plate glass on edge in a slightly leaning position. In order for the rack to receive plate glass of varying vertical dimensions, the rack is vertically adjustable. For this purpose, the rack is made of relatively vertically adjustable upper and lower sections and the adjustment is accomplished by means of gear and rack mechanism associated therewith. Associated with the gear and rack mechanism is a brake unit which will automatically lock the rack in any expanded or contracted position to which it is adjusted.

Various other objects and advantages will be apparent from the drawings, the description, and the claims.

In the accompanying drawings, one example of this invention is illustrated but it is to be understood that specific details thereof may vary without departing from the basic principles of this invention.

In these drawings:

Figure 1 is a perspective view of a rack constructed in accordance with this invention and showing it mounted on a truck.

Figure 2 is a rear view of the rack showing the adjusting mechanism.

Figure 3 is an end elevational view of the rack.

Figure 4 is a detail in vertical section taken along line 4—4 of Figure 2 and showing the gear and rack adjusting mechanism.

Figure 5 is an enlarged detail view of the brake associated with the adjusting mechanism, this view being taken on line 5—5 of Figure 2.

With reference to the drawings, in Figure 1 there is shown a plate glass rack constructed according to this invention and mounted on a truck. This rack comprises the main or lower section 10 which is preferably supported on the truck so that it leans inwardly at a slight angle.

The lower section 10 of the rack comprises the lower sill 11 (Figure 1) which extends longitudinally of the truck and is suitably secured thereto below the bed of the truck body at the outer side thereof and upon which the lower edge of the plate glass is adapted to rest. This sill 11 is of L-shape cross-section (Figure 3) and has padding 12 and 13 on its respective horizontal and vertical inner surfaces. This padding may be of soft plastic or other suitable material. The lower rack section 10 also includes the A-frames 14 which are upstanding from the bed of the truck body at longitudinally spaced intervals. Transversely at the forward inwardly leaning edges of the A-frames 14 and secured thereto at vartically spaced intervals are the slats 15. These slats 15 are provided with padding 16 (Figure 3) of soft plastic or other suitable material with which the rear surface of the plate glass is adapted to contact when it is supported on edge by the sill member 11.

Mounted on the upper end of the lower section 10 of the rack is a vertically adjustable upper section 20. This upper section 20 is provided with vertically disposed slide members 21 which are suitably spaced longitudinally and in the example shown are equal in number to the A-frames 14 and are disposed directly adjacent the corresponding A-frames. The upper ends of these slide members 21 carry a horizontally disposed longitudinally extending upper member 22 which is of inverted L-form and which is provided with padding 23 on its inner vertical surface and padding 24 on its inner lower surface similar to the slat padding 16. The horizontal part of this member 22 will project over the glass supported on the lower section 10 of the rack and can be adjusted so that the padding 24 will contact with the upper edge thereof to aid in holding the glass on the rack with its lower edge on the padding 12 of the sill 11 and with its inner face in contact with the slat padding 16, the padding 13 on the vertical part of the sill and the padding 23 on the vertical part of the upper member 22. The slide members 21 are mounted in vertical guide channels 25 which are rigidly secured to the A-frames 14 adjacent their upper ends.

For moving the upper section 20 of the back 10 of the rack vertically relative to the lower section 10, the gear and rack arrangement shown in the drawings is provided. This gear and rack arrangement includes a longitudinally extending shaft 26 which is rotatably carried in bearings 27 supported by vertical triangular plate brackets 28 that are rigidly secured to the A-frames 14. The shaft 26 is located closely behind the guide channels 25 and in alignment with each channel the shaft carries a pinion gear 29. Each of these gears 29 meshes with a rack 30 carried by the adjacent corresponding slide 21. Each guide channel 25 is open at its rear side (Figures 2 and 4) and the rack 30 of each slide member 21 is at the rear side thereof and projects rearwardly out of the guide channel, as shown best in Figure 4. Obviously, when the shaft 26 is rotated, the pinions 29 are rotated and since they are in engagement with the racks 30 of the slide members 21, which are a part of the movable upper section 20, the section 20 will be raised or lowered relative to the lower section 10, depending upon the direction of rotation of the shaft 26. During the vertical movement of the upper rack section 20 relative to the lower rack section 10, the slide members 21 will slide in and be guided by the guide channels 25 which are carried by the A-frames 14.

The end of the shaft 26 is made of angular form for receiving a reversible ratchet wrench 31 which can be removably mounted thereon. This wrench 31 may be used in positively rotating the shaft 26 in either selected direction.

For holding the upper rack section 20 in any position to which it is extended relative to the lower rack section 10, a brake unit 32 is associated with the shaft 26. This brake unit is illustrated best in Figure 5. It comprises a brake drum 33 which is keyed to the shaft 26 at a position adjacent one of the guide channels 25. Associated with the brake drum 33 is a brake shoe 34 in the form of a band of metal which carries a brake lining 35 on its inner surface. One end of this band 34 is anchored to a bracket member 36 by an adjustable anchoring bolt 37. This bracket 36 is rigidly secured to the adjacent guide channel 25. This bolt 37 is slidably mounted in the member 36. The other end 38 of the band 31 is provided with an opening through which the bolt 37 also slidably extends. It will be apparent that the friction on the drum 32 may be varied by adjustment of the nut 39 carried by the bolt 37 and engaging the bracket 36. A compression spring 40 is provided on the bolt 37 between the end 38 of the band and a stop collar 41 on the bolt.

With reference to Figure 5, it will be apparent that when the shaft 26 is turned clockwise, the upper rack section 20 is lowered and when it is turned counterclockwise this section is raised relative to the lower rack section 10. The amount of friction exerted on the brake drum 33 can be adjusted as indicated above, and this can be overcome positively by the ratchet wrench 31. The weight of the section 20 tends to lower the section and the brake 32 is so designed that there is an automatic locking action which prevents this lowering action. It will be noted from Figure 5 that the weight of the section 20 will tend to rotate the drum 32 in a clockwise direction. This tends to compress the spring 35 and cause the band 31 to more tightly engage the drum 32. However, the section 20 can be lowered by means of the wrench 30 positively turning the shaft 25 clockwise, and overcoming the friction exerted by the band 31 on the drum 32. When the shaft 25 is turned counterclockwise, the spring 35 is extended and the friction exerted by the band 31 on the drum 32 is decreased so that the section 20 can be raised readily.

It will be apparent from the above description that the upper rack section 20 may be positively adjusted up or down by means of the ratchet wrench 31. This adjustment may be made so that the rack can receive plate glass of varying heights. When the glass is positioned on the lower section, the section 20 may be lowered to cause the padding 24 on the upper member 22 to engage the upper edge of the glass. The glass may be held in place on the rack by additional means of the type disclosed in my co-pending application directed to a Clamping Bracket for Plate Glass, Serial No. 626,142, filed December 4, 1956.

The vertical extension of the rack may be accomplished quickly with little effort and the brake 32 serves to lock the upper section 20 in any extended position to which it is adjusted. There is no danger of the upper section 20 dropping into contact with the upper edge of the plate glass supported by the lower section 10 of the rack and thereby causing damage thereto.

Various other advantages will be apparent.

Having thus described this invention, what is claimed is:

1. A plate glass supporting rack comprising a lower section for supporting the glass, an upper section, means for mounting the upper section on the lower section for adjustment relative thereto, said lower section and said upper section comprising telescoping cooperative vertical members, adjusting means cooperatively connected between said lower section and said upper section, means for operating said adjusting means, said adjusting means comprising a rack carried by one of said sections and a gear carried by the other section in mesh with the rack, said operating means including a rotatably supported shaft which carries said gear, a brake associated with said adjusting means for automatically holding said upper section in adjusted position, said brake being associated with the shaft, said brake comprising a drum carried by the shaft and a cooperating friction band carried by a fixed support associated with the shaft.

2. A plate glass supporting rack comprising a lower section and an upper section which telescopes therewith, means for extending or contracting the upper section relative to the lower section, said means comprising racks carried by the upper section, gears carried by the lower section and meshing with said racks, said gears being keyed on a single shaft rotatably mounted on the lower section, and means for positively rotating said shaft, a brake unit associated with said shaft, said brake unit comprising a drum keyed to said shaft and a friction band anchored to said rack lower section and engaging said drum.

3. A plate glass supporting rack according to claim 2 in which one end of the band is anchored to a support fixed relative to the shaft by an adjustable anchoring bolt and the other end has an opening through which the bolt slidably extends, and a compression spring on the bolt between said last-named end of the band and a stop fixed on said bolt which normally causes the band to grip the drum.

4. A plate glass supporting rack according to claim 3 in which the band is so disposed on the drum that rotation of the shaft in the direction which lowers the rack upper section tends to compress said spring and to cause said band to more firmly engage the drum.

References Cited in the file of this patent

UNITED STATES PATENTS

| | | |
|---|---|---|
| 1,879,513 | Rothholz | Sept. 27, 1932 |
| 1,915,802 | Roshnell | June 27, 1933 |